United States Patent [19]

Kaiser et al.

[11] Patent Number: 4,581,966

[45] Date of Patent: Apr. 15, 1986

[54] CHOP SAW LINKAGE SYSTEM FOR MOVING SAW GUARD

[75] Inventors: Horst Kaiser, Elz; Rainer Herting, Langenhahn, both of Fed. Rep. of Germany

[73] Assignee: Black & Decker, Inc., Towson, Md.

[21] Appl. No.: 723,711

[22] Filed: Apr. 16, 1985

Related U.S. Application Data

[63] Continuation of Ser. No. 610,510, May 15, 1984, abandoned.

[30] Foreign Application Priority Data

Jun. 11, 1983 [DE] Fed. Rep. of Germany ....... 8317143
Jun. 11, 1983 [DE] Fed. Rep. of Germany ....... 8317154

[51] Int. Cl.$^4$ .............................................. B23D 45/04

[52] U.S. Cl. ........................................ 83/397; 83/478; 83/490

[58] Field of Search ........... 83/397, 478, 490, DIG. 1; 51/268

[56] References Cited

U.S. PATENT DOCUMENTS

| | | | |
|---|---|---|---|
| 3,821,918 | 7/1974 | Niehaus | 83/471.3 |
| 3,994,192 | 11/1976 | Faig | 83/490 |
| 4,002,094 | 1/1977 | Erickson et al. | 83/471.3 |
| 4,028,975 | 6/1977 | Bennett | 83/478 X |
| 4,318,324 | 3/1982 | Hall et al. | 83/397 |

FOREIGN PATENT DOCUMENTS

| | | | |
|---|---|---|---|
| 74204765 | 12/1974 | Fed. Rep. of Germany . | |
| 2829297 | 1/1980 | Fed. Rep. of Germany . | |
| 2312327 | 12/1976 | France | 83/478 |

*Primary Examiner*—James M. Meister
*Attorney, Agent, or Firm*—Finnegan, Henderson, Farabow, Garrett & Dunner

[57] ABSTRACT

A chop saw pivotably mounted for movement between a raised rest position and a lowered operational position, having a motor driven saw-blade rotatably supported about a shaft, with a saw housing partially encasing the saw-blade and a swinging blade guard which covers the exposed segment of the saw-blade when the saw is in the rest position. When the saw is lowered to its operational position, a linkage system comprising four effective levers and four hinges clears the blade guard, thereby exposing the saw blade to the work piece. To accommodate changing the saw blade while the saw-unit is in its rest position, the effective length of one of the levers can be temporarily reduced, thereby clearing the blade guard from the exposed section of the saw blade. This provides easy access to the saw-blade to be changed.

8 Claims, 4 Drawing Figures

CHOP SAW LINKAGE SYSTEM FOR MOVING SAW GUARD

This application is a continuation, of application Ser. No. 610,510, filed May 15, 1984, now abandoned.

BACKGROUND OF THE INVENTION

1. Field of the Invention

This invention relates to table mounted, power circular saws which are primarily intended to perform a chopping function.

2. Description of the Prior Art

Traditionally chop saws are pivotably mounted on a saw table, between a raised rest position and a lowered operational position. For safety reasons, it is desirable to provide a hood to cover the saw blade when the saw is in the rest position. Convenience dictates that any such blade guard should be mounted in a maner such that it will be swung clear of the saw blade when the saw is pivoted from its rest position to its operational position. Prior art devices, such as German Offenlegungsschrift No. 28 29 297, have attempted to solve this problem by coupling the swinging hood to a saw table with a cable in order to pivot the hood to clear the blade when the saw unit is lowered to its operational position.

An inherent problem with such prior art devices is that when the saw unit is in the raised rest position, the blade guard hampers attempts to change the saw blade. Likewise, it is difficult to change a saw blade in the operational position because the saw table gets in the way.

When the chop saw is not in use, it is also desirable for safety reasons to lock the saw-unit in its rest position with the blade covered. Prior art locking systems, such as the one disclosed in German Gebrauchsmuster 74 20 476, keep the raised saw unit in the rest position by means of a locking element that engages a stationary locking surface. To be released, the locking element must displace a spring. In such an arrangement, the entire weight of the saw unit rests upon the locking element, which accordingly must be very rugged in order to prevent damage when the user inadvertently attempts to force the saw-unit down while the locking element remains engaged to the locking surface.

The instant invention has overcome many of the disadvantages of prior art devices by providing a linkage system which effectively clears the blade guard from the saw blade when the chop saw is lowered to the operational position while being partially collapsible in order to facilitate changing of the saw blade by allowing the protective blade guard to be swung out of position while the saw is maintained in the rest position. Additionally, the linkage system of the present invention engages a locking element when the saw unit is in its rest position in a manner that reduces the forces that must be absorbed by the locking element.

Additional advantages of the invention are set forth in part in the description which follows, and in part will be obvious from the description, or may be learned by practice of the invention.

SUMMARY OF THE INVENTION

The objects and advantages of the invention may be realized and attained by means of the instrumentalities and combinations particularly pointed out in the appended claims.

In a chop saw pivotally mounted on a bearing bracket for movement between a lowered, operational position and a raised, rest position, having a motor-driven saw blade rotatably supported on a shaft, a housing partially encasing the saw blade and a swinging blade guard disposed to cover an exposed segment of the saw blade when the chop saw is in the raised position, the invention comprising a linkage system for moving the blade guard in response to movement of the chop saw between the lowered and raised positions. The linkage system includes a frame member fixed to and extending upwardly from the bearing bracket, an actuation lever, a first hinging means for pivotally mounting the housing near the base of the frame member, a second hinging means pivotally attaching one end of the actuation lever to the frame member upwardly from the first hinging means, a third hinging means pivotally attaching the other end of the actuation lever to the swinging blade guard, and a fourth hinging means pivotally connecting the swinging blade guard to the housing. The third hinging means is eccentrically positioned on the blade guard with respect to the fourth hinging means and the distance between the third and fourth hinging means being substantially less than the distance between the first and second hinging means such that the blade guard immovably covers the exposed segment of the chop saw in the raised position and is moved to uncover the exposed segment when the chop saw is moved to the lowered position.

Preferably the linkage system of the invention further includes means for selectively disengaging the second hinging means to permit temporary shortening of the effective length of the actuation lever and moving of the blade guard to uncover the exposed segment when the chop saw is in the raised position for facilitating changing the saw blade.

It is also preferred that the linkage system include a locking means for detachably engaging the actuation lever when the saw is in the raised position.

BRIEF DESCRIPTION OF THE DRAWINGS

The accompanying drawings, which are incorporated in and constitute a part of the specification, illustrate embodiments of the invention, and, together with the description, serve to explain the principals of the invention.

DESCRIPTION OF THE PREFERRED EMBODIMENT

Figure 1:
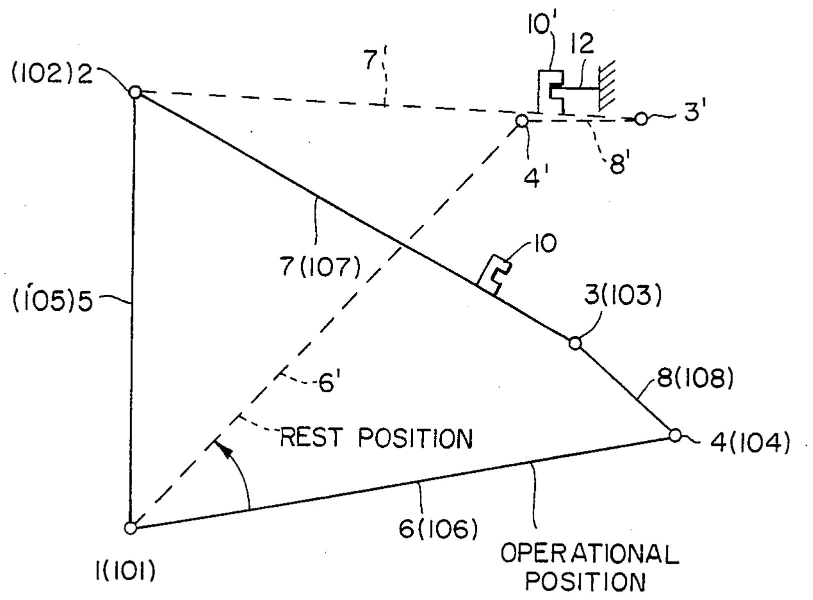
FIG. 1 is a schematic diagram of the linkage system in both the operational and rest positions.

Reference will now be made in detail to the present preferred embodiments of the invention, examples of which are illustrated in the accompanying drawings.

The invention relates to a saw unit particularly suited to carrying out a chopping type function. The preferred embodiment of the chop saw includes a power circular saw-unit 90 pivotably mounted on a saw table 20 for movement between a raised rest position and a lowered operational position. The saw-unit preferably includes an electric motor, not shown, which rotatably drives a saw blade 32 about its supporting shaft 104; a housing 106 which partially encases the blade 32 and a pivotably mounted blade guard 108 that immovably encases the exposed portion of the saw blade 32 when the saw-unit is in the rest position.

The improvement of this invention as embodied and generally described herein relates to a linkage system which clears the blade guard 108 when the saw unit 90 is lowered into the operational position, thereby exposing blade 32 to the workpiece.

In accordance with the present invention, a preferred embodiment of the linkage system, schematically shown in FIG. 1, includes four hinging means, 1, 2, 3 and 4 as well as four effective levers, 5, 6, 7 and 8. The first hinge is stationary and is located at the base of lever 5 which is also stationary. A lever 6 is pivotably mounted to the lower end of lever 5 by the first hinge. Lever 6 corresponds to the saw housing 106 of FIG. 2, and the pivotal motion of the first hinge corresponds to the movement of the saw-unit between its rest position and its operational position. Lever 8 is pivotably connected to lever 6 by hinge 4. Lever 8 corresponds to the swinging blade guard 108 of FIG. 2. Lever 7 is pivotally connected to lever 5 at hinge 2 and to lever 8 at hinge 3.

The lever positions depicted by solid lines in FIG. 1 represent the saw in the operational position. The dashed lines represent the rest position. Since the effective length of lever 8 is substantially less than the effective length of lever 5, lever 8, which corresponds to the swinging blade guard 108, has a much greater arc of rotation than does lever 6, which corresponds to movement of housing 106 between the rest position and the operational position. In order to reach the operational position, lever 6′ is pivoted clockwise about hinge 1. This causes a counterclockwise rotation of lever 8 about hinge 4. This corresponds to the movement of the swinging blade guard 108 as the saw is lowered. Since initially the distnce between hinge 3′ and hinge 1 must increase, lever 7′ is initially required to swing upwardly about hinge 2.

An engaging element 10 is mounted on lever 7. When the saw is in its rest position, engaging element 10′ attaches to locking element 12 to secure the saw in that position. In the rest position, as shown by the dashed line in FIG. 1, hinge 3′ is further from lever 5 connecting the first and second hinges than is hinge 4′ and the two essentially form a straight line with hinge 2. Thus, when the saw is in the rest position, the alignment of the levers is such that the majority of the load acting on the saw unit is transmitted by levers 7′ and 8′, thereby alleviating the bulk of the load on locking element 10.

Figure 2:
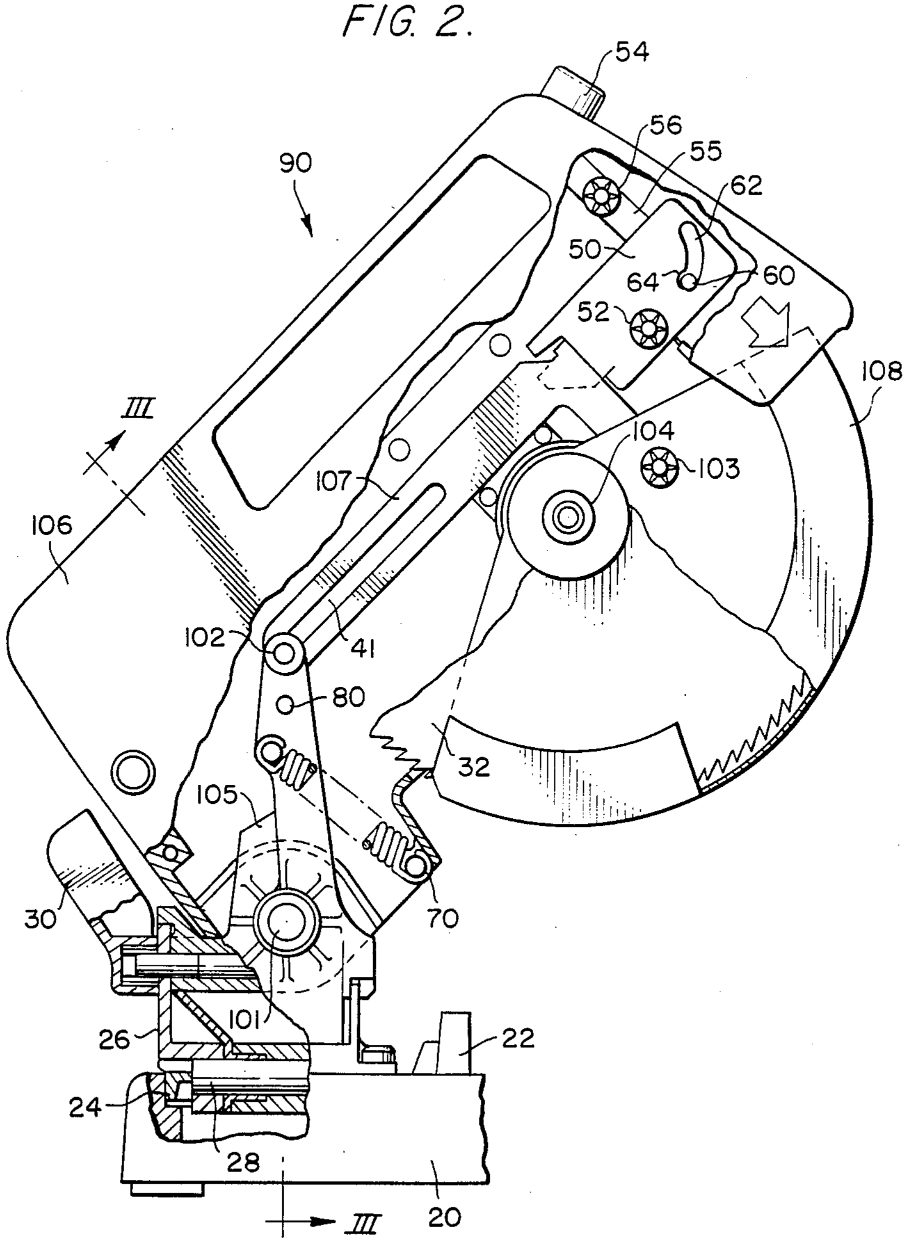
FIG. 2 is a side elevation of the chop saw with a fragmentary sectional view of the locking mechanism and a portion on the linkage system.
Figure 3:
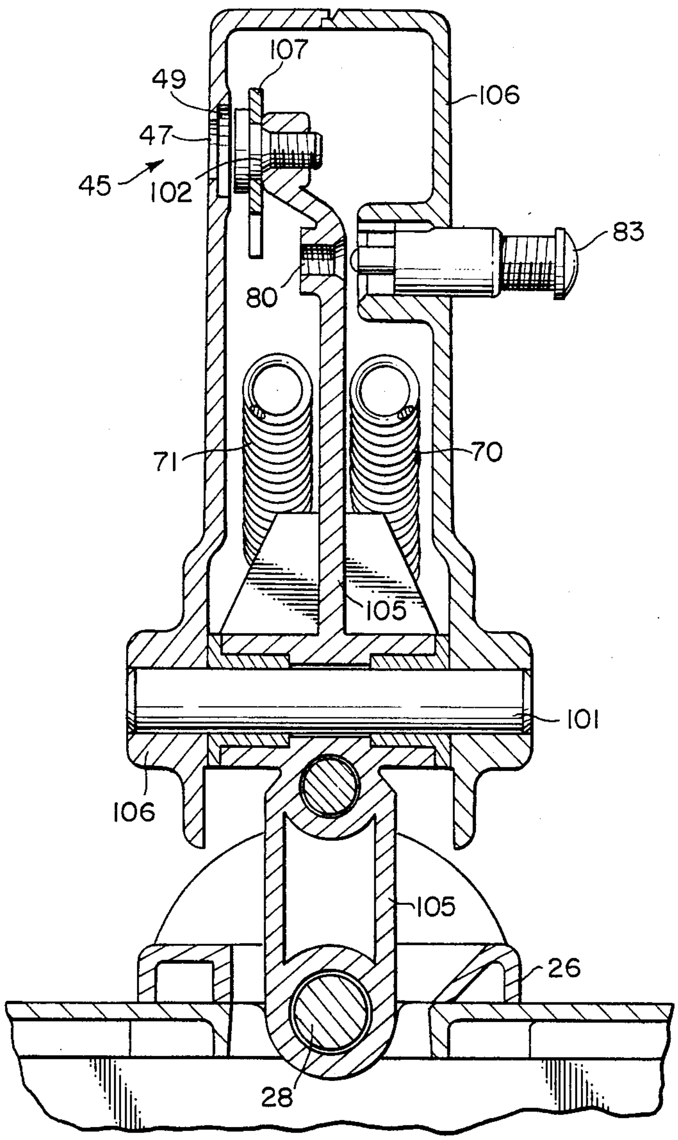
FIG. 3 is a cross-sectional view of the chop saw taken along line III—III of FIG. 2, emphasizing the relationship of the pivot bolt that attaches the frame member to the actuation lever.

The safety saw shown in FIGS. 2 and 3 comprises a conventional saw table 20 with a workpiece stop 22 against which the workpiece may rest. A revolving seat 24 is rotatably supported on saw table 20 and holds bearing bracket 26 through which passes horizontal shaft 28. Frame element 105 is attached to revolving seat 24. When clamping knob 30 is loosened, frame 105 may be rotated about the axis of shaft 28. This makes possible the mitersetting of the saw-unit.

Shaft 101 is mounted in frame 105 and supports saw housing 106 in a pivotable manner. This pivot-junction corresponds to hinge 1 of FIG. 1, and housing 106 corresponds in function to the effective lever 6 of the linkage system shown in FIG. 1.

Frame 105 extends upwardly from shaft 101 and terminates at a pivot junction with actuation lever 107.

The pivot junction is formed by a pivot bolt 102 which corresponds to hinge 2 of FIG. 1. Frame 105 corresponds to effective lever 5 of FIG. 1 and actuation lever 107 corresponds to effective lever 7 of the linkage system shown in FIG. 1. Actuation lever 107 is pivotably connected to swinging blade guard 108 by a pivot joint 103. Pivot joint 103 which corresponds to hinge 3 shown in FIG. 1, is eccentrically positioned on blade guard 108 about the saw blade support shaft 104. Swinging blade guard 108 corresponds to lever 8 in FIG. 1.

The saw blade 32 is rotatably supported by a saw blade support shaft 104 in housing 106 and is driven by an electric motor, not shown, located on the back of the saw as seen in FIG. 2. The saw blade support shaft shares the same axis of rotation as swinging blade guard 108. Saw blade support shaft 104 corresponds, in location, to the hinge 4 of FIG. 1.

When the saw unit is lowered from its rest position, the saw housing 106 is rotated about the first hinging means, shaft 101. Actuation lever 107 is similarly rotated in a clockwise manner about pivot bolt 102. As is apparent from the schematic diagram of FIG. 1, this combination of motion causes a relatively large rotation of the swinging blade guard 108 about the saw blade support shaft 104 corresponding to a relatively small rotation of the saw housing 106 about shaft 101. This combination of motions allows the swinging blade guard 108 to rotate clear of the sawblade 32 when the saw unit is lowered to its operational position.

Figure 4:
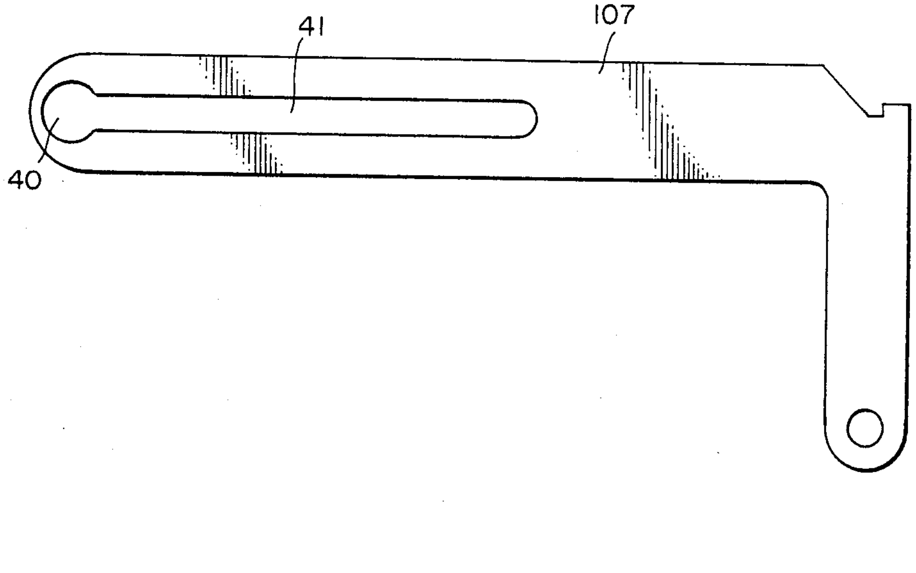
FIG. 4 is an elevation view of the actuation lever.

In a preferred embodiment, actuation lever 107 is L-shaped. Such a structure assures that the actuation lever will always be outside the range of displacement of saw blade support shaft 104. This permits the entire linkage system to be mounted essentially in a single plane. L-shaped actuation levr 107 has a pivot point aperture 40 at the outer end of its longer leg, as can be seen by reference to FIG. 4. Adjoining the pivot point aperture 40 is a slot 41 which runs longitudinally along the center of the longer leg of the L-shaped actuation lever 107. The width of slot 41 is less than the diameter of pivot point aperture 40.

As shown in FIG. 3, it is preferred that pivot bolt 102 has a threaded end section of lesser diameter than its shank. When the saw unit is operational, pivot bolt 102 is threadably secured to frame member 105. The pivot point aperture 40 of actuation lever 107 receives the shaft of pivot bolt 102. It is preferred that the width of slot 41 be less than the diameter of the shaft of pivot bolt 102, but greater then the diameter of the threaded portion of the pivot bolt.

It is further preferred that an opening 45 be cut into housing 106 in a location such that it will be aligned with pivot bolt 102 when the saw unit is in its rest position. The opening 45 preferably consists of a bore 47 expanded by an inner cavity 49 internal to the housing 106.

To accommodate changing saw blade 32, the saw unit is placed in the rest position. A screw driver, inserted through the opening 45 in saw housing 106 can be used to partially withdraw pivot bolt 102 from frame member 105. It is preferred that the face of inner cavity 49 be located in a manner such that while it prevents pivot bolt 102 from being totally withdrawn from frame member 105, it allows sufficient space for the shank of pivot bolt 102 to be cleared from the L-shaped actuation lever 107. This allows the actuation lever to slide freely along the threaded portions of pivot bolt 102. The swinging blade guard 108 can then be raised without moving the saw unit from its rest position. Saw blade 32 may then be freely changed without any obstruction from blade guard 108. The head of pivot bolt 102 which is within inner cavity 49 prevents the saw-unit from being lowered to it's operational position until the actuation lever 107 has been returned to its normal position and pivot bolt 102 is turned back into place.

In a preferred embodiment, a locking element 50 engages the actuation lever 107 when the chop saw is in its rest position. Locking element 50, which is pivotably mounted about pivot axis 52, is connected to a lock release button 54 by a release lever 55. The release lever itself is mounted pivotably about a pivot axis 56.

In order to lower the saw blade so it may engage a workpiece, the locking element 50 must be disengaged. To accomplish this, lock release button 54 is depressed. As a result, release lever 55, which is attached at one end to lock release button 54, is rotated about pivot axis 56. This rotation causes an upward displacement of pin 60 which is mounted at the opposite end of release lever 55. Locking element 50 is provided with a curved slit 62 that has an enlarged clearance 64 at the lower end thereof. When pin 60 is forced upwards by the actuation of lock release button 54, it forces locking element 50 to rotate in a clockwise direction as seen in FIG. 2. This rotation of locking element 50 causes actuation lever 107 to rotate about pivot bolt 102 in a counterclockwise direction. Simultaneously, the third hinging means 103, which corresponds to hinge 3 in the schematic shown in FIG. 1, is raised above the line connecting hinges 2 and 4 (which correspond to pivot bolt 102 and sawblade support shaft 104 respectively), thereby eliminating the dead position. Thereupon, locking element 50 is disengaged and the saw unit can be easily lowered.

Tension springs 70 and 71 are mounted to the frame at one end and to the housing at their other end, in a manner such that they exert an upward force on the pivotably mounted housing 106. Springs 70 and 71 automatically pivot the saw into the rest position shown in FIG. 2 when the user releases housing 106.

A threaded borehole 80 is present in frame 105 between the points acted upon by the springs 70 and 71 on one side and the pivot bolt 102 on the other. The borehole 80 is configured to receive a locking screw 83 that is mounted on the housing unit 106 in a manner such that when the saw unit is lowered into its operational position, the locking screw 83 and the borehole 80 are aligned. It is therefore possible to lock the saw unit in its lowered position, which is desirable, for example, when the saw unit is being transported.

It will be apparent to those skilled in the art that various modifications and variations could be made to the chop saw linkage of the invention without departing from the scope or spirit of the invention.

What is claimed is:

1. In a chop saw pivotally mounted on a bearing bracket for movement between a lowered, operational position and a raised, rest position, having a motor driven saw blade rotatably supported on a shaft, a housing partially encasing the saw blade, and a swinging blade guard disposed to cover an exposed segment of the saw blade when the chop saw is in the rest position, the improvement being a linkage system for moving the blade guard in response to movement of the chop saw between the lowered and raised positions, such that the blade guard immovably covers said exposed segment when the chop saw is in the raised position and is moved to uncover said exposed segment when the chop saw is moved to the lowered position, said linkage system comprising;

a frame member fixed to and extending upwardly from said bearing bracket;

an actuation lever;

first hinging means for pivotally mounting the housing near the base of said frame member;

second hinging means pivotally attaching one end of said actuation lever to said frame member upwardly from said first hinging means;

third hinging means pivotally attaching the other end of said actuating lever to the swinging blade guard; and fourth hinging means pivotably connecting said swinging blade guard to the housing;

said third hinging means being eccentrically positioned on said blade guard with respect to said fourth hinging means and the distance between said third and fourth hinging means being subsantially less than the distance between said first and second hinging means.

2. The linkage system of claim 1 further comprising means for selectively disengaging said second hinging means to permit temporary shortening of the effective length of said actuation lever and moving of the blade guard to uncover said exposed segment when the chop saw is in the raised position for facilitating changing said saw blade.

3. The linkage system as recited in claim 2 wherein:

said second hinging means is a pivot bolt having a shank received through a pivot point aperture in said actuation lever, and a threaded end section threadably secured to said frame member, said threaded end section having a diameter less then said shank; and said means for disengaging said second hinging means comprises an axial slot in said actuation lever adjoining the pivot point aperture, the width of said slot being less than the diameter of the shank of the pivot bolt and less than the diameter of said pivot point aperture and greater than the diameter of said threaded portion; and means for partially withdrawing the threaded end section of said pivot bolt from said frame member to dispose part of said threaded end section for slidable movement in said axial slot.

4. The linkage system as specified in claim 3 wherein said withdrawing means includes an opening in said housing providing access to the head of said pivot bolt when the chop saw is in the raised position permitting manual partial withdrawal of said threaded end section from said frame member.

5. The linkage system as specified in claim 4 wherein said opening includes a central bore of insufficient diameter to permit removal of said pivot bolt therethrough and an expanded inner cavity of sufficient diameter to receive the head of said pivot bolt and wherein disposition of the head of said pivot bolt in said inner cavity prevents the chop saw from being moved to the lowered position.

6. The linkage system as recited in claim 3 wherein said actuation level is L-shaped and is connected to said pivot bolt by its longer leg and is attached to the third hinging means by its shorter leg, permitting said linkage system to be essentially mounted in one plane.

7. The linkage system as defined in claim 6 wherein the axis of rotation of the fourth hinging means is the longitudinal axis of the shaft supporting the saw-blade.

8. The linkage system as specified in claim 3 further comprising a locking means for detachably engaging the actuation lever when the saw is in the raised position.

* * * * *